United States Patent [19]

Puma et al.

[11] Patent Number: 5,339,259
[45] Date of Patent: Aug. 16, 1994

[54] HIGH SPEED HIGH RESOLUTION ULTRASONIC POSITION AND ORIENTATION TRACKER

[75] Inventors: Samuel C. Puma, Torrance; John B. Sinacori, Pebble Beach, both of Calif.; Yorke J. Brown, Binghamton, N.Y.

[73] Assignee: Northrop Grumman Corporation, Los Angeles, Calif.

[21] Appl. No.: 912,962

[22] Filed: Jul. 10, 1992

[51] Int. Cl.⁵ .................................................. G01S 1/72
[52] U.S. Cl. ........................... 364/559; 364/571.01; 367/117; 367/125; 367/903
[58] Field of Search ........... 364/559, 560, 561, 571.01; 367/117, 125, 129, 903

[56] References Cited

U.S. PATENT DOCUMENTS

| | | | |
|---|---|---|---|
| 3,777,305 | 12/1973 | Stoutmeyer | 367/127 |
| 3,836,953 | 9/1974 | Rotier | 367/117 |
| 4,303,394 | 12/1981 | Berke et al. | 434/40 |
| 4,446,480 | 5/1984 | Breglia et al. | 364/559 |
| 4,649,504 | 3/1987 | Krouglicof et al. | 364/559 |
| 4,742,356 | 5/1988 | Kuipers | 342/448 |
| 4,807,202 | 2/1989 | Cherri et al. | 367/129 |
| 4,829,250 | 5/1989 | Rotier | 364/559 |
| 4,853,863 | 8/1989 | Cohen et al. | 364/460 |
| 5,036,477 | 7/1991 | Forster et al. | 364/571.01 |
| 5,128,794 | 7/1992 | Mocker et al. | 364/559 |

*Primary Examiner*—Jack B. Harvey
*Assistant Examiner*—Kyle J. Choi
*Attorney, Agent, or Firm*—Terry J. Anderson; Robert B. Block; Karl J. Hoch, Jr.

[57] ABSTRACT

A continuous wave ultrasonic tracking system using an ultrasonic transmitter acoustically radiating a continuous wave ultrasonic transmitted signal and an ultrasonic receiver detecting the transmitted signal as a received signal. The system mixes the transmitted and received signals to create an interference pattern characterized by interference fringes, counts the number of the fringes by which the pattern changes with respect to a fixed point and stores the number as a number of wavelengths of the displacement between the transmitter and receiver, interpolates a location of the fixed point between successive ones of the interference fringes as a fraction of a wavelength and stores the fraction of a wavelength and computing the displacement by combining the number of wavelengths and the fractional number of wavelengths.

21 Claims, 4 Drawing Sheets

HIGH SPEED HIGH RESOLUTION ULTRASONIC POSITION AND ORIENTATION TRACKER

BACKGROUND OF THE INVENTION

1. Technical Field

The invention is related to position tracking systems generally and particularly to tracking pilot helmet position in the cockpit of a flight vehicle or simulator using ultrasonic transmitters mounted in the cockpit and ultrasonic transducers mounted on the helmet, or vice versa.

2. Background Art

Position tracking systems for monitoring the position of an article such as a pilot's helmet in a cockpit are useful for such purposes as maintaining a computer-generated projected image display in the pilot's field of view, for example. Other purposes include tracking any part of a person's body such as the head, hand or finger, so that the person may generate inputs to a computer by the movement of his head, hand or finger, for the control of cursor movement in a computer display, for example. Other applications include robotics and weapon systems.

The advantages of employing ultrasonic waves to perform such position tracking over techniques employing electromagnetic signals (such as those disclosed in U.S. Pat. No. 4,742,356 to Kuipers and U.S. Pat. No. 4,303,394 to Berke et al.) are well-known. Essentially, electromagnetic systems are far more vulnerable to interference from many noise sources. Ultrasonic position tracking techniques are well-known. For example, U.S. Pat. No. 4,807,202 to Cherri et al. discloses an ultrasonic tracking system in which the orientation and position of a movable object (such as a helmet) in a closed frame of reference (such as a cockpit) is continually tracked by following the six degrees of freedom of movement of the moveable object. This is accomplished, as illustrated in FIG. 1 hereof, by mounting three ultrasonic transmitters 100, 102, 104 in three different locations in the closed frame of reference 106 and mounting three ultrasonic transducers 108, 110, 112 in three different locations on the moveable object 114. Each one of the three transmitters 100, 102, 104 transmits an ultrasonic acoustic wave signal at a different ultrasonic frequency, all of which are received at each one of the three transducers 108, 110, 112. The three ultrasonic frequencies received at each transducer are separated into three received signals, so that a total of nine signals are received and processed. A tracking processor 116 processes each of the nine signals to provide the distance between the transducer and the transmitter corresponding to the frequency of the received signal, thus providing nine distances. Using well-understood principles, the tracking processor 116 computes the instantaneous position and orientation of the moveable object 114 with respect to the closed frame of reference from the nine distances. This computation uses the locations of the transmitters in the closed frame of reference and the locations of the transducers with respect to the frame of reference of the moveable object.

Various methods of transmitting and processing the ultrasonic signals are employed, all with varying degrees of limited performance. The basic limitation of such methods is that they are slow, limiting the rate at which the position and orientation of the movable object can be repeatedly computed. Most of the methods employ a pulsed ranging ultrasonic technique, such as the techniques disclosed in U.S. Pat. No. 4,853,863 to Cohen et al., U.S. Pat. No. 4,807,202 to Cherri et al., U.S. Pat. No. 3,836,953 to Rotier and U.S. Pat. No. 3,777,305 to Stoutmeyer.

The above-referenced patent to Cohen et al. discloses an ultrasonic position tracking technique in which the frequency shift of the ultrasonic signal due to helmet movement is measured and integrated to provide a displacement value from which the transmitter-to-receiver range is computed.

The problem with the pulse or sequential techniques is that the time required for the receiver to acquire a sufficient ultrasonic signal from which the transmitter-to-receiver range can be inferred limits the rate at which the helmet position can be tracked. For example, the ultrasonic pulsed ranging techniques are limited by the time of flight between the transmitter and the receiver. Generally, it is believed that such sequential techniques produce an updated position measurement for a given sensor at a rate not exceeding on the order of 10 Hz. Most users would be pleased by a 100 Hz update rate. Pulse or sequential techniques are limited to a total time of 9 time-of-flight intervals, or about 30 ms. In a room with echoes, this figure may be 3 or 4 times as large. Consequently, the maximum update rate for sequential techniques is 30 Hz, although a more practical update rate is 10 Hz. Another problem with sequential techniques is that the data is incoherent. The 9 ranges are not simultaneous. As will be shown below, the present invention provides the 9 ranges simultaneously as coherent data, a significant advantage over the prior art.

The problem with the technique of integrating the frequency shift is that its maximum update rate is limited by the time required to measure frequency, compute the doppler shift and then integrate it so as to produce a displacement value from which to compute a range.

What is needed is an ultrasonic position tracker which will track the moveable object position at far higher rates and provide the nine measurements coherently or simultaneously. However, given the present state of the art, such tracking rates do not seem possible.

SUMMARY OF THE INVENTION

The invention is an ultrasonic position tracking system which tracks the position of a moveable object with respect to a fixed frame of reference to within a fraction of the ultrasonic wavelength at a maximum rate of tens of thousands of times per second, or about the frequency of the ultrasonic carrier employed. The ultrasonic position tracking of the invention is a continuous wave ultrasonic interferometric displacement detector in which displacement of a movable object is detected in the wave interference or relative phase between the transmitted and received ultrasonic waves. The displacement is measured to within one ultrasonic carrier wavelength by counting interference fringes or zero phase crossings. The displacement measurement is then refined to within a fraction of the ultrasonic carrier wavelength by interpolating between adjacent interference fringes. In order to provide a rough position within the closed frame of reference from which the fringe count can be initialized, the ultrasonic carrier is modulated by a low frequency acoustic signal whose wavelength is at least as great as the diameter of the closed frame of reference. The low frequency signal is detected and its phase determined to provide a rough but unambiguous estimate of the range between the transmitter and receiver. Either one of the transmitter and receiver is fixed on the movable object while the other is stationary with respect to the closed frame of reference.

The key to the high speed of the invention is that a new wavelength count or displacement measurement is always available. In an ideal implementation of the invention, changes in the fringe count register immediately upon the occurence of a phase coincidence. The only delay is one time-of-flight interval. The invention avoids sequencing of measurements. A new fractional wavelength count is always available with each cycle of the received signal, so that it is available at the frequency of the ultrasonic carrier.

In another aspect of the invention, the moveable object is an inertial measurement unit, and the ultrasonic position tracker updates the inertial measurement unit's internal position information to correct for drift to which all inertial measurement units are prone. The ultrasonic position tracker of the invention is sufficiently fast to update the inertial measurement unit in a meaningful way, while the inertial measurement unit provides a continuous measurement of position and orientation and therefore maintains accurate position measurements between updates provided by the ultrasonic position tracker.

BRIEF DESCRIPTION OF THE DRAWINGS

FIG. 5 is a simplified block diagram illustrating the application of the circuit of FIG. 2 with an inertial measurement unit in accordance with an alternative embodiment of the invention.

DETAILED DESCRIPTION OF THE INVENTION

Figure 1:
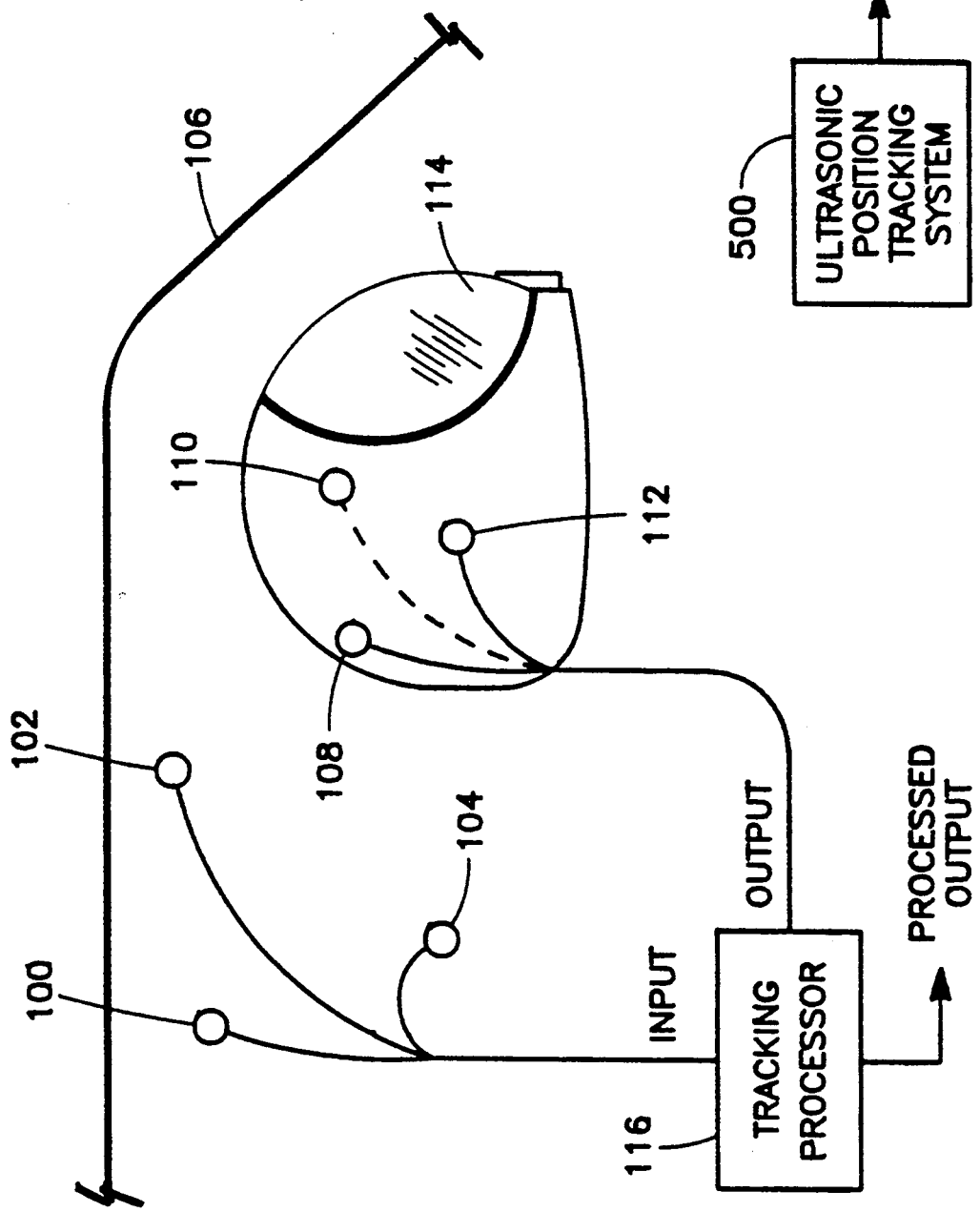
FIG. 1 is a simplified diagram of an ultrasonic position tracking system of the prior art employing three transmitters operating at three different frequencies and three transducers.
Figure 2:
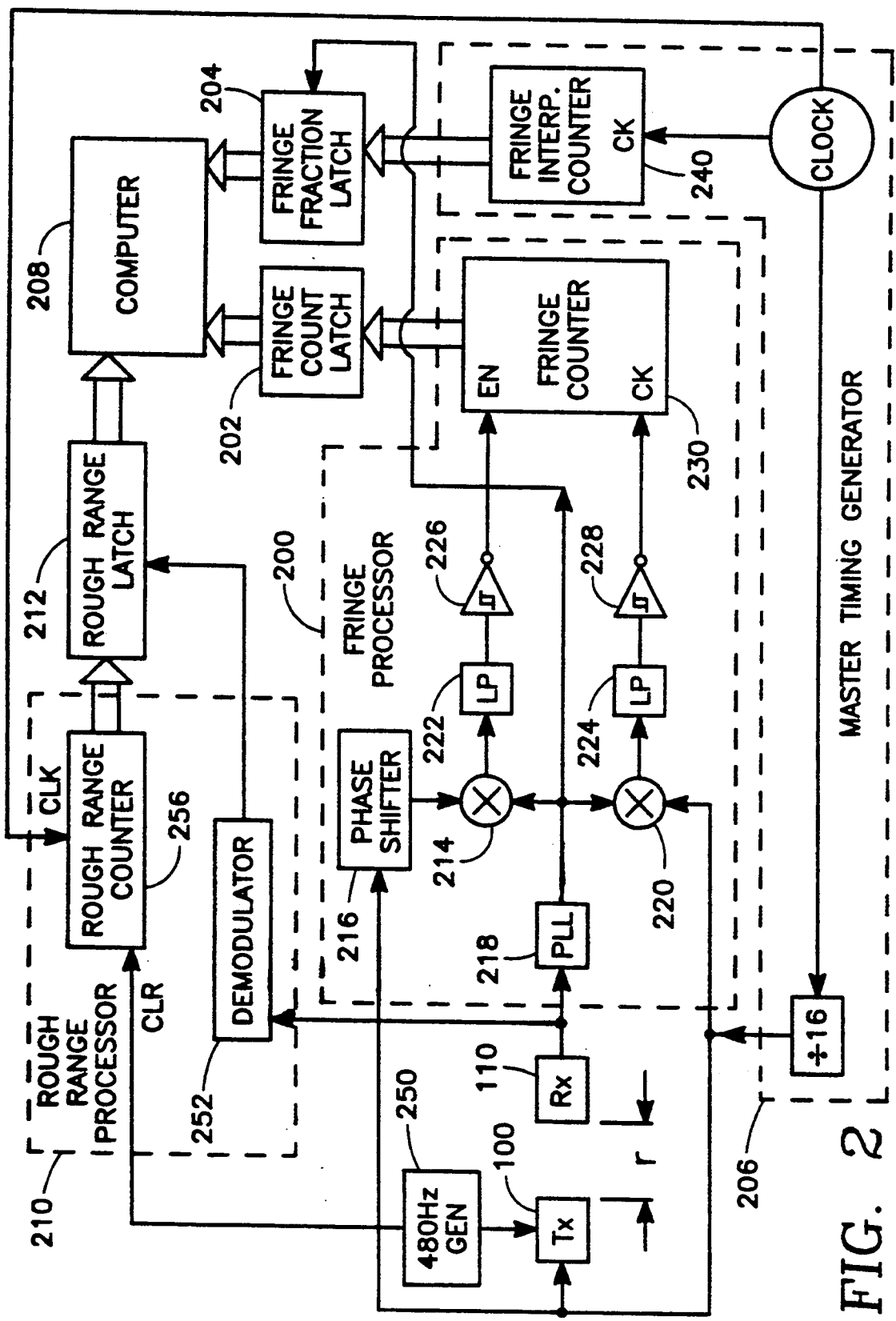
FIG. 2 is a schematic block diagram illustrating one channel of a circuit embodying the invention.

FIG. 2 illustrates a typical circuit of the invention used in each one of the nine channels in the tracking processor 116 of FIG. 1. In the example illustrated in FIG. 2, the circuit processes the one signal received by the receiving transducer 110 from the transmitter 100, it being understood that there are a total of nine such processing tasks to be performed, corresponding to the nine received signals discussed above with reference to FIG. 1.

The main advantage of the invention is that it exploits the C.W. form of the received ultrasonic signal by an interferometric comparison of the transmitted and received versions of a signal in which any change by a single fringe of the resulting interference pattern produces a change in the computed tracking position. The fastest rate at which this change can occur is the frequency of the ultrasonic signal, or about 40 kHz in one implementation of the invention. This is an increase in tracking rate of about two orders of magnitude over the prior art.

Overview

The interferometric displacement detector circuit of FIG. 2 includes a fringe processor 200 having inputs connected to receive both the transmitted and received signals, a fringe count latch 202 connected to one output of the fringe processor 200 and a fringe fraction latch 204 connected to another output of the fringe processor 200. A master timing generator 206 synchronizes the operation of the circuit of FIG. 2 and the generation of the ultrasonic signal (on the order of 40 kHz, for example) produced by the transmitter 100. The pair of latches 202 and 204 are periodically sampled by a computer 208. As will be described below herein, the computer 208 samples a total of nine such pairs of latches corresponding to the nine received ultrasonic signals discussed hereinabove. The computer 208 is programmed in accordance with the prior art techniques referred to previously herein to compute the position and orientation of the helmet or tracked object 114.

Accompanying the interferometric detector circuit is a rough range processor 210 which responds to a low frequency (480 Hz, for example) signal modulating the ultrasonic carrier transmitted by the transmitter 100 to provide a rough but unambiguous position of the helmet 114 within the cockpit or frame of reference 106. The output of the rough range processor 210 is held in a rough range latch 212 which is sampled by the computer 208 as desired. The wavelength of the rough range modulation signal must be at least on the order of the diameter or greatest length of the cockpit or closed frame of reference 106, and so its frequency is typically on the order of 480 Hz.

Fringe Processor

The fringe processor 200 detects the phase differences between the received signal of the transducer 110 and the transmitted signal in quadrature pair and deduces therefrom each zero-crossing of the phase difference. The fringe processor 200 includes a phase detector 214 which detects the phase difference between two signals: (a) the signal transmitted by the transmitter 100 and signal phase-shifted by 90 degrees by a phase shifter 216 and (b) the signal received by the receiver 110 and bandpass filtered and converted to square wave by a phase-locked loop 218. (For this purpose, the phase-locked loop 218 is of the type well-known in the prior art having a square wave oscillator.) Another phase detector 220 detects the phase difference between the transmitted signal and the output of the phase-locked loop 218. The output signal amplitudes of the detectors 214, 220 are proportional to the phase differences of the signal pairs received by the phase detectors. The output signals of the pair of phase detectors 214, 220 are low pass filtered by a pair of filters 222, 224 and are compared with a threshold by a pair of Schmitt triggers 226, 228, respectively.

Operation of the Fringe Processor

Figures 3A, 3B, 3C, 3D, 3E, 3F, 3G:
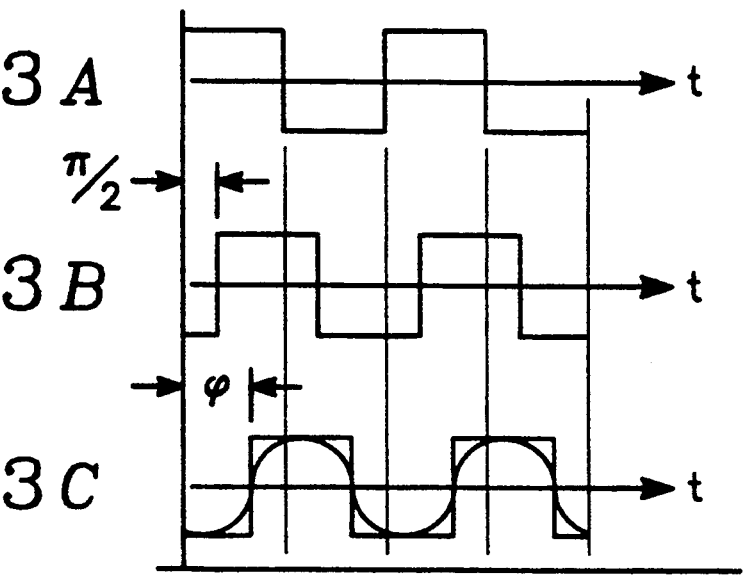
FIGS. 3A through 3C are contemporaneous diagrams of time domain waveforms generated in the operation of the circuit of FIG. 2.
FIGS. 3D through 3G are diagrams of correlative phase domain waveforms generated in the operation of the circuit of FIG. 2.

FIG. 3A illustrates the time domain pulsed waveform (a square wave) of the signal furnished by the master timing generator 206 to the transmitter 100. The reactive elements of the transmitter 100 (or, alternatively, an active filter not shown in the drawings) convert the square waveform to a corresponding sine wave shown in FIG. 3A, so that a sine wave C.W. signal is received by the transducer 110. FIG. 3B illustrates the waveform at the output of the phase shifter 216. FIG. 3C illustrates the signal received by the transducer 110 as converted to a square wave at the output of the phase-locked loop 218. FIGS. 3D and 3E illustrate in the phase domain the magnitude of the signal at the output of the low pass filters 222 and 224, respectively, as a function of increasing phase difference detected by the phase detectors 214, 220, respectively.

FIGS. 3F and 3G illustrate the outputs of the Schmitt triggers 226, 228, respectively. Essentially, each time the input to the Schmitt trigger 226 or 228 falls below its trigger threshold (dashed line of FIGS. 3D or 3E), the Schmitt trigger output goes high, and each time the input rises above the trigger threshold the output goes low. Note that the leading edges of the output of the Schmitt trigger 228 (FIG. 3F) coincide with the zero phase crossings of the phase detector 220 (FIG. 3D), which is the only one of the two phase detectors whose input is not phase shifted. These leading edges of the Schmitt trigger 228 are detected by employing the output of the other Schmitt trigger 226 as a gate: whenever the output of the other Schmitt trigger 226 is low, sampling of the output of the Schmitt trigger 228 is enabled. For this purpose, the fringe counter 230 has its clock input connected to the Schmitt trigger 228 and its enable input connected to the other Schmitt trigger 226. The fringe counter 230 is of the well-known type in which up-going transitions at its clock input cause the fringe counter 230 to count up while down-going transitions at its clock input cause the fringe counter 230 to count down. The contents of the fringe counter 230 indicate the number of fringes or zero crossings caused by displacement of the helmet 114.

Fringe Interpolation

The master timing generator 206 produces fringe interpolation clock pulses at a rate which is an integral multiple (e.g., 4, 8, or 16 times) the frequency of the transmitted ultrasonic signal. A fringe interpolation counter 240 counts the fringe interpolation clock pulses. The rate of the fringe interpolation clock pulses (e.g., n times the transmitted ultrasonic signal frequency) and the modulus of the counter 240 (e.g., n) are selected so that the counter 240 automatically resets at the end of each sinusoidal period of the transmitted ultrasonic signal. The fringe fraction latch 204 latches the output of the fringe interpolation counter 240 in synchronism with the received ultrasonic signal at the output of the phase-locked loop 218. Thus, the change in phase (range) between fringes is measured to within a fraction (1/n) of the wavelength of the ultrasonic signal.

In the example of FIG. 2, the master timing generator 206 derives the ultrasonic carrier for the transmitter 100 by dividing down the fringe interpolation counter by some integer (e.g., 16). However, the ultrasonic carrier may be derived by simply connecting the transmitter 100 to the most significant bit of the fringe interpolation counter 240.

Rough Ranging

The rough range processor 210 operates simply by measuring the phase of the low frequency (e.g., 480 Hz) modulation signal imposed on the ultrasonic carrier. Since the wavelength of the low frequency modulation is at least as great as the longest dimension of the closed frame of reference or cockpit 106, the phase difference between the transmitted and received signals is a unique measure of the range from transmitter to receiver in the cockpit 106.

As illustrated in FIG. 2, a low frequency (e.g., 480 Hz) oscillator 250 modulates the ultrasonic signal transmitted by the transmitter 100. A conventional AM demodulator 252 in the rough range processor 210 demodulates the low frequency (e.g., 480 Hz) signal received at the receiver 110. In the meantime, a rough range counter counts 256 up in synchronism with the low frequency oscillator 250 and is latched in the latch 212 by the output of the demodulator 252. Preferably, the modulus of the rough range counter 256 and rate at which it counts are selected so that the counter 256 resets at the end of each period of the low frequency modulation signal. Thus, the contents of the latch 212 indicates the phase of the modulation, which is a direct measure of the range between the transmitter and receiver.

Multi-channel Layout

Figure 4:
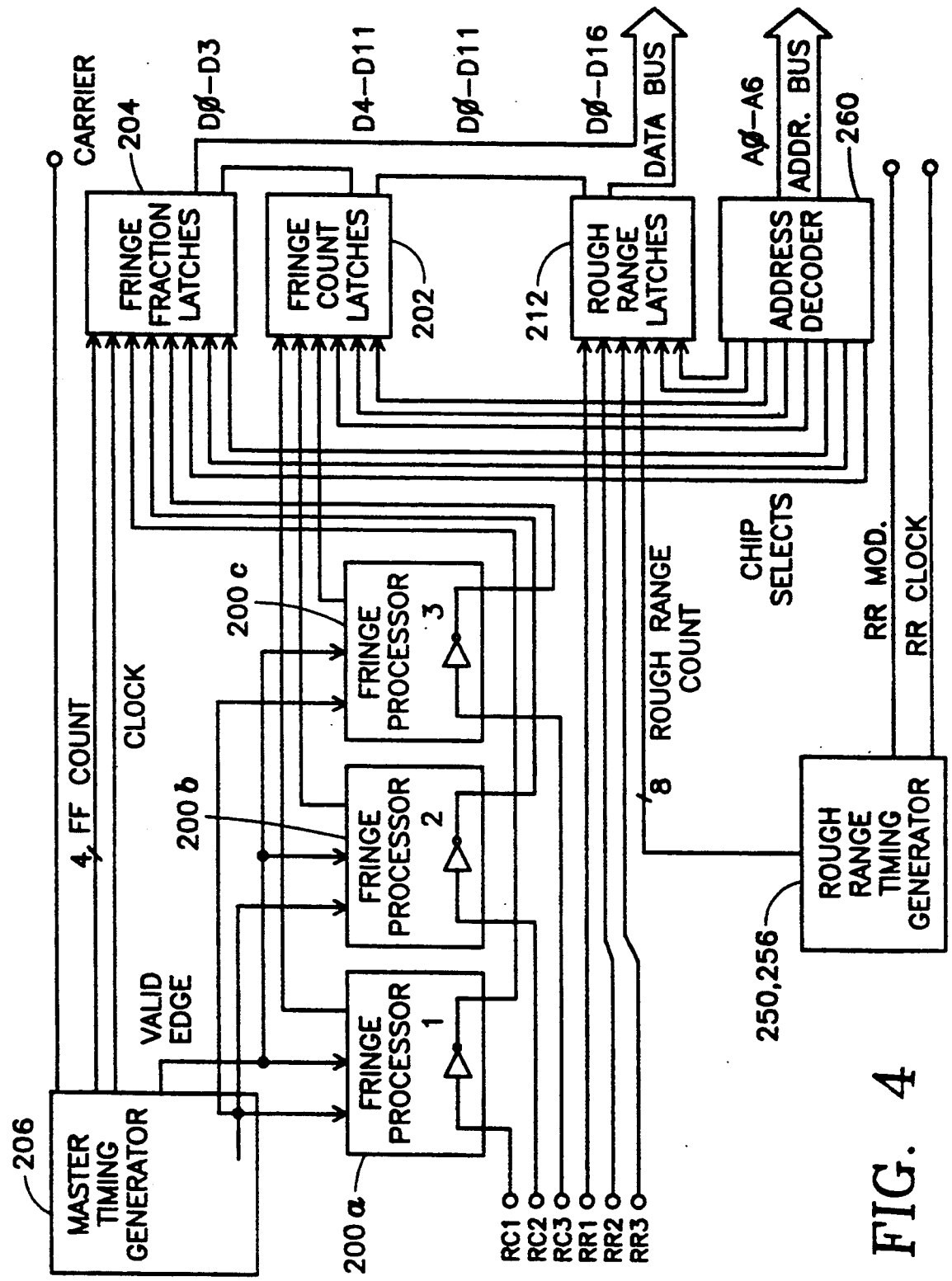
FIG. 4 is a schematic block diagram illustrating a digital implementation of three channels of the type illustrated in FIG. 2.

FIG. 4 is a diagram corresponding to FIG. 2 but showing at a higher level how the three ultrasonic frequencies detected by the receiver 110 are processed. In one implementation of the invention, the three ultrasonic frequencies are 37 kHz, 40 kHz and 43 kHz. Thus, in FIG. 4 there are three fringe processors 200a, 200b and 200c corresponding to the fringe processor 200 of FIG. 2, three ultrasonic received carrier signals RC1, RC2 and RC3 and three rough range received signals RR1, RR2 and RR3. In addition, an address decoder 260 permits the computer 208 to selectively address any one or portions of the various latches 204, 204 and 212, in accordance with well-known techniques, as required by the computer's program. The apparatus of FIG. 4 is associated with one of the transducers, there being three transducers in all, so that FIG. 4 illustrates about one third of the system of the invention comprising a complete tracking processor of the type illustrated in FIG. 1.

Computer

The contents of the latches 202 and 204 provide the range between the transmitter 100 and the receiving transducer 110 in the form of a wavelength count (the latch 202) and a fraction of a wavelength (the latch 204). The computer 208 is programmed in accordance with the techniques of the prior art discussed hereinabove to periodically sample the contents of the latches 202 and 204 for each of the nine received ultrasonic signals and compute therefrom the helmet position and orientation. The computer 208 also periodically samples the contents of the rough range latch 212, to verify the value of the fringe count and correct it if necessary.

Combination with an Inertial Measurement Unit

Referring to FIG. 5, the system 500 of FIG. 1 implemented with three circuits of FIG. 4 for each of the three transducers 108, 110, 112 is used to periodically update an inertial measurement unit 502. The inertial measurement unit constantly provides position and orientation data, while the ultrasonic position tracking system of the invention 500 provides measurements only at periodic intervals corresponding to the position tracking rate discussed above. However, while the inertial measurement unit is therefore superior in its ability to continuously provide such measurements, it suffers from a tendency to drift. The advantage of the embodiment of FIG. 5 is that drift errors are minimized by periodically updating the inertial measurement unit 502 with its correct position and orientation as measured by the ultrasonic tracking system 500 at a very high rate. For this purpose, the three transducers 108, 110, 112 are placed on or mechanically coupled to the inertial measurement unit 502, while the output of the computer 208 embodying the tracking processor 116 of FIG. 1 is transmitted to the inertial measurement unit 502. The inertial measurement unit updates its position and orientation data with the measurements received from the ultrasonic tracking system 500. The position tracking system 500 may be the ultrasonic position tracking system described above or may be a magnetic, infared or electromagnetic position tracking system of the type well known in the art.

While the invention has been described in detail by specific reference to preferred embodiments thereof, it is understood that variations and modifications may be made without departing from the true spirit and scope of the invention.

What is claimed is:

1. An ultrasonic tracking system, comprising:
   a transmitter producing an ultrasonic continuous wave transmitted signal at first location;
   a receiver sensing a received ultrasonic continuous wave signal corresponding to said transmitted signal at a second location;
   means connected to said transmitter and to said receiver for measuring a phase difference between said transmitted and received signals and for generating an incremental or decremental count whenever an increase or decrease, respectively in said phase difference results in a phase difference of zero;
   means for maintaining an algebraic sum of said incremental and decremental counts indicative of an integral number of wavelengths of said transmitted signal by which said first and second locations are displaced from one another relative to an initial displacement, said algebraic sum being updated with each zero crossing of said phase difference; and
   means for sensing a number of predetermined fractions of one wavelength of said transmitted signal by which said transmitted and received signals are out of phase with respect to one another, said number of predetermined fractions being updated with each cycle of said transmitted ultrasonic signal, the displacement of said first and second locations being determined as integral number of wavelengths plus said number of predetermined fractions of said wavelength.

2. The system of claim 1 wherein relative movement of one of said locations with respect to the other is limited to a confining space characterized by a maximum length, said system further comprising:
   means for modulating said transmitted ultrasonic signal with a modulation signal having a long wavelength corresponding to said maximum length of said confining space;
   means for demodulating a signal received at said receiver to extract said modulation signal;
   means for sensing a number of predetermined fractions of said long wavelength by which said transmitted and received carrier signals are out of phase with respect to one another to provide a rough measurement of the relative displacement of said first and second locations to within said predetermined fraction of said long wavelength.

3. The system of claim 1 wherein said means for measuring a phase difference and for generating a incremental or decremental count comprise:
   means for measuring a second phase difference between said received signal and a quadrature version of said transmitted signal;
   first trigger means for transitioning to a first or second state thereof whenever said phase difference is below or above a trigger threshold;
   second trigger means for transitioning to a first or second state thereof whenever said phase difference is below or above a trigger threshold;
   means responsive to said second trigger means being in the second state of said second trigger means for producing an incremental count whenever said first trigger means transitions from said second to said first state of said first trigger means and for producing a decremental count whenever said first trigger means transitions from said first state to said second state of said first trigger means.

4. The system of claim 1 wherein said means for sensing a number of predetermined fractions of said wavelength comprise an interpolation counter characterized by a counting rate which is an integral multiple of the frequency of said transmitted signal and means for latching said counter in synchronism with said received signal.

5. An ultrasonic position tracking system for monitoring the position and orientation of a movable object in a closed frame of reference, said system comprising:
   means for transmitting n respective ultrasonic signals from respective predetermined transmitter locations fixed with respect to one of said movable object and said frame of reference;
   means for receiving said n respective ultrasonic signals at m predetermined receiver locations fixed with respect to the other of the movable object and said frame of reference to provide n×m received signals;
   m×n channels for processing respective ones of said in m×n received signals, wherein each of said channels comprises:
   (a) means connected to said transmitter and to said receiver for measuring a phase difference between a respective pair of said transmitted and received signals and for generating an incremental or decremental count whenever an increase or decrease, respectively in said phase difference results in a phase difference of zero;
   (b) means for maintaining an algebraic sum of said incremental and decremental counts indicative of an integral number of wavelengths of said transmitted signal by which a respective pair of said first and second locations are displaced from one another relative to an initial displacement, said algebraic sum being updated with each zero crossing of said phase difference; and
   (c) means for sensing a number of predetermined fractions of one wavelength of the respective transmitted signal by which said respective pair of transmitted and received signals are out of phase with respect to one another, said number of predetermined fractions being updated with each cycle of said respective transmitted ultrasonic signal, and the displacement of said respective pair of first and second locations being said integral number of wavelengths plus said number of predetermined fractions of said wavelength.

6. The system of claim 5 further comprising a host computer programmed to periodically sample current values of said number of wavelengths and said number of predetermined fraction of wavelengths for all of said m×n channels and further programmed to compute therefrom a position and orientation of said movable object with respect to said frame of reference.

7. The system of claim 6 further comprising an inertial measurement unit which continually computes and stores position and orientation information describing the position and orientation of said inertial measurement unit, wherein one of said plurality of first and second locations are fixed and the other comprises locations on said inertial measurement unit, the position and orientation computed by said host computer being that of said inertial measurement unit, said host computer being in communication with aid inertial measurement unit and is further programmed to periodically update the position and orientation information stored in said inertial measurement unit.

8. The system of claim 6 wherein said closed frame of reference is characterized by a maximum length, said system further comprising:
means for modulating each transmitted signal with a transmitted acoustic carrier signal having a long wavelength corresponding to said maximum length of said confining space;
each of said m×n channels further comprising:
(a) means for sensing a respective received carrier signal at a respective receiver corresponding to modulation of a respective transmitted carrier;
(b) means for sensing a number of predetermined fractions of said long wavelength by which said respective transmitted and received carrier signals are out of phase with respect to one another to provide a rough measurement of the relative displacement of said respective pair of first and second locations to within said predetermined fraction of said long wavelength;
wherein said host computer is further programmed to compute from said number of predetermined fractions of said long wavelength the displacement of the respective pair of first and second locations to within said predetermined fraction of said long wavelength and to update therefrom said number of predetermined fractions of said wavelength of said respective ultrasonic transmitted signal.

9. The system of claim 5 wherein said means for measuring a phase difference and for generating a incremental or decremental count comprise:
means for measuring a second phase difference between said respective received signal and a quadrature version of said respective transmitted signal;
first trigger means for transitioning to a first or second state thereof whenever said phase difference is below or above a trigger threshold;
second trigger means for transitioning to a first or second state thereof whenever said second phase difference is below or above a trigger threshold;
means responsive to said second trigger means being in the second state of said second trigger means for producing an incremental count whenever said first trigger means transitions from said second to said first state of said first trigger means and for producing a decremental count whenever said first trigger means transitions from said first state to said second state of said first trigger means.

10. The system of claim 5 wherein said means for sensing a number of predetermined fractions of said wavelength comprise an interpolation counter characterized by a counting rate which is an integral multiple of the frequency of said respective transmitted signal and means for latching said counter in synchronism with said respective received signal.

11. A method of tracking displacement between an ultrasonic transmitter acoustically radiating a continuous wave ultrasonic transmitted signal and an ultrasonic receiver detecting said transmitted signal as a received signal, said method comprising:
creating an interference pattern characterized by interference fringes by mixing said transmitted and received signals;
counting the number of said fringes by which said pattern changes with respect to a fixed point and storing said number as a number of wavelengths of said displacement;
interpolating a location of said fixed point between successive ones of said interference fringes as a fraction of a wavelength and storing said fraction of a wavelength; and
computing said displacement by combining said number of wavelengths and said fractional number of wavelengths.

12. The method of claim 11 wherein one of said transmitter and receiver is stationary and movement of the other of said transmitter and receiver is confined within a space characterized by a confinement length, said method further comprising:
modulating said transmitted signal with a low frequency modulation signal whose wavelength corresponds to said confinement length and detecting the modulation signal at said receiver;
measuring a phase difference between transmitted and received versions of said modulation signal and converting said phase difference to a location within said space.

13. The method of claim 11 wherein one of said ultrasonic transmitter is attached to an inertial measurement unit and the other is at a known location, said method further comprising:
updating said inertial measurement unit with position information derived from the displacement computed in said computing step.

14. A method of overcoming drift error in an inertial measurement unit which continuously generates information describing its position and orientation in a frame of reference, said method comprising:
operating said inertial measurement unit (IMU) to generate continuous position and orientation information relative to said frame of reference for all times following a initialization time wherein its reference is established from another source;
acoustically radiating respective continuous wave ultrasonic transmitted signals from a plurality of first respective locations;
detecting each of said transmitted signals as a received signal at a plurality of second respective locations, wherein one of said pluralities of first and second locations are fixed to a frame of reference and the other comprises locations on said inertial measurement unit;

processing said transmitted and received signals so as to generate a second source of position and orientation of said inertial measurement unit; and periodically initializing position and orientation information generated by said inertial measurement unit with said second source position and orientation information.

15. A method of overcoming drift error in an inertial measurement unit which continuously generates information describing its position and orientation, said method comprising:

acoustically radiating respective continuous wave ultrasonic transmitted signals from a plurality of first respective locations;

detecting each of said transmitted signals as a received signal at a plurality of second respective locations, wherein one of said pluralities of first and second locations are fixed to a frame of reference and the other comprises locations on said inertial measurement unit;

processing said transmitted and received signals so as to generate a position and orientation of said inertial measurement unit; and periodically correcting position and orientation information generated by said inertial measurement unit with the position and orientation generated in said processing step, and further in which, for each respective pair of transmitted and received signals, the steps of:
 (a) creating an interference pattern characterized by interference fringes by mixing said transmitted and received signals;
 (b) counting the number of said fringes by which said pattern changes with respect to a fixed point and storing said number as a number of wavelengths of said displacement;
 (c) interpolating a location of said fixed point between successive ones of said interference fringes as a fraction of a wavelength and storing said fraction of a wavelength; and
 (d) computing said displacement by combining said number of wavelengths and said fractional number of wavelengths; and for all pairs of transmitted and received signals, deriving from the corresponding displacements computed in said computing step said orientation and position of said inertial measurement unit.

16. Apparatus for tracking displacement between an ultrasonic transmitter acoustically radiating a continuous wave ultrasonic transmitted signal and an ultrasonic receiver detecting said transmitted signal as a received signal comprising:

means for transmitting an ultrasonic signal from a first location with a space, means for receiving ultrasonic signals at a record location within said space, means for combining said transmitted and received signals to produce an interference pattern therefor having maxima and minima, means for tracking the movement of said receiving means relative to said transmitting means by counting shifts in said interference pattern through maxima and minima that occur as a result of movement of said receiving means relative to said transmitting means.

17. The system of claim 16 wherein relative movement of one of said locations with respect to the other is limited to said space and is characterized by a maximum length, said system further comprising:

means for modulating said transmitted ultrasonic signal with a modulation signal having a long wavelength corresponding to said maximum length of said confining space;

means for demodulating a signal received at said receiver to extract said modulation signal; and means for sensing a number of predetermined fractions of said long wavelength by which said transmitted and received carrier signals are out of phase with respect to one another, to provide a rough measurement of the relative displacement of said first and second locations to within said predetermined fraction of said long wavelength.

18. The system of claim 17 wherein said means for measuring a phase difference and for generating a incremental or decremental count comprise:

means for measuring a second phase difference between said received signal and a quadrature version said transmitted signal;

first trigger means for transitioning to a first or second state thereof said phase difference is below or about a trigger threshold;

second trigger means for transitioning to a first or second state thereof whenever said second phase difference is below or about a trigger threshold;

means response to said second trigger means being in the second state of said second trigger means for producing a incremental count whenever said first trigger means transitions from said second to said first state of said first trigger means and for producing a decremental count whenever said first trigger means transitions from said first state to said second state of said first trigger means.

19. The system of claim 17 wherein said means for sensing a number of predetermined fractions of said wavelength comprise an interpolation counter characterized by a counting rate which is an integral multiple of the frequency of said transmitted signal and means for latching said counter in synchronism with said received signal.

20. A method for tracking displacement between an ultrasonic transmitter acoustically radiating a continuous wave ultrasonic transmitted signal and an ultrasonic receiver detecting said transmitted signal as a received signal comprising the steps of:

transmitting an ultrasonic signal from a first location with a space, receiving ultrasonic signals at a record location within said space, combining said transmitted and received signals to produce an interference pattern therefor having maxima and minima, and tracking the movement of said receiving means relative to said transmitter by counting shifts in said interference pattern through maxima and minima that occur as a result of movement of said receiver relative to said transmitter.

21. The method of claim 20 wherein relative movement of one of said locations with respect to the other is limited to said space and is characterized by a maximum length, said method further including the steps of:

modulating said transmitted ultrasonic signal with a modulation signal having a long wavelength corresponding to said maximum length of said confining space;

demodulating a signal received at said receiver to extract said modulation signal; and sensing a number of predetermined fractions of said long wavelength by which said transmitted and received carrier signals are out of phase with respect to one another, to provide a rough measurement of the relative displacement of said first and second locations to within said predetermined fraction of said long wavelength.

* * * * *